United States Patent [19]

DeCarlo

[11] Patent Number: 4,822,087
[45] Date of Patent: Apr. 18, 1989

[54] LIFT IMPROVEMENT DEVICE

[76] Inventor: Tony J. DeCarlo, 2225 Grand Ave., Niagara Falls, N.Y. 14301

[21] Appl. No.: 132,784

[22] Filed: Dec. 14, 1987

[51] Int. Cl.$^4$ .......................... A01K 75/00; B25G 3/26
[52] U.S. Cl. .................... 294/1.1; 16/114 R; 43/11; 294/19.1; 294/25; 294/58
[58] Field of Search .................. 294/1.1, 15, 18, 19.1, 294/19.2, 25, 26, 55, 57, 58; 15/143 R, 144 R, 145; 16/110 R, 113, 114 R, DIG. 12, DIG. 24; 43/7, 11, 21.2, 23, 25; 210/470, 471; 273/67 R, 84 R; 224/222, 267

[56] References Cited

U.S. PATENT DOCUMENTS

| | | | |
|---|---|---|---|
| 929,173 | 7/1909 | Stone | 294/26 X |
| 2,482,589 | 9/1949 | Maguire | 294/1.1 |
| 2,595,597 | 5/1952 | Morseth | 43/11 X |
| 2,921,397 | 1/1960 | Luthi | 43/11 X |
| 3,367,056 | 2/1968 | Johnson | 43/25 |
| 3,372,509 | 3/1968 | Arsenault | 43/25 X |
| 3,372,510 | 3/1968 | Arsenault | 43/25 X |

FOREIGN PATENT DOCUMENTS 622630  5/1949  United Kingdom .................. 294/25

*Primary Examiner*—Johnny D. Cherry
*Attorney, Agent, or Firm*—William J. Crossetta

[57] ABSTRACT

The invention relates to a lift improvement device comprising a hollow main elongated member, having a forearm support at one end and a handle grip from about 7 to about 18 inches along the elongated member from the forearm support. The hollow elongated member is configured to receive a pole or handle therethrough and the device has particular utility for slidably mounting on poles or handles to allow single handed manipulation of end working devices which, in turn, are mounted on the poles or handles.

11 Claims, 1 Drawing Sheet

LIFT IMPROVEMENT DEVICE

BACKGROUND OF THE INVENTION

In many activities, such as the pruning of trees, netting of fish and butterflies, shoveling, sweeping, opening and closing of skylights, overhead windows and the like, the worker is required to manipulate a pole which has mounted on one end thereof a working device such as a pruning device, net, shovel, broom, latching device or the like. Typically, in order to effectively operate such end working device on such pole requires the worker to maintain both hands on the manipulative end of the pole, because of the high moments of force occasioned by the weight of the end working device and the length of the pole. For example, most workers find it very difficult to prune a tree with the typical long handled pruning device, particularly when the pole is more than about five feet in length. This is occasioned by the difficulty of properly positioning the pole with one hand, while operating the typical cable controlled end pruning device with the other hand. Similarly, a fisherman engaged with a fishing rod in one hand while attempting to land a large fish with a long handled net in the other hand, often finds it impossible to properly position the net. Even if he manages to position the net, the weight of the fish in the net may require him to discard his fishing rod in order to place both hands on the long handle of the net for retrieval of the fish.

One object of the invention is to provide a convenient lift improvement device, readily adaptable to poles, long handles and the like, which will allow effective, single-handed manipulation of one end of a pole or handle in the operation of a working device contained at the other end of that pole or handle.

Another object of the invention is to provide a portable lift device which can be readily adaptable to multiple different poles and handles.

A further object of the invention is to provide poles, rods, tubes and the like which are configured at one end thereof with the lift improvement device of the invention.

A still further object of the invention is to provide a netting device containing the lift improvement device of the invention at one end and a net working device at the other. These and other objects of the invention will become apparent from the following disclosure of the invention.

SUMMARY OF THE INVENTION

In accordance with the foregoing, a lift improvement device is provided comprising an elongated main member, preferably tubular and of suitable internal configuration for sliding over the manipulative end of a pole, rod, tube and the like and comprising a forearm support means, handle gripping means and affixing means. The forearm support means is positioned at, or proximate, one end of the main member and is of suitable configuration to support a forearm. At a point approximately 7 to about 18 inches from said forearm support means comprises a handle means attached to said main member, configured suitable to being gripped by a hand. The forearm support means and the handle means are disposed on the main member in such configuration as to assure that upon gripping the handle, with the wrist in the relaxed position and unrotated, the forearm support means contacts the backside of the forearm and the main member generally follows the backside of the forearm in a straight line from the wrist to the elbow.

Further, in accord with the invention, poles, rods, tubes and the like, having use as shovel handles, pruning device handles, net handles and the like are provided having affixed thereto at, or proximate, one end thereof a forearm support means and at a point from about 7 to about 18 inches from said forearm support means a handle gripping means suitable for being gripped by a hand and configured such that upon gripping the handle, with the wrist in the relaxed position and unrotated, the forearm support means contacts the backside of the forearm and the pole, rod, tube and the like comprises the main member which generally follows the backside of the forearm in a straight line from the wrist to the elbow.

DESCRIPTION OF DRAWINGS OF PREFERRED EMBODIMENTS

DESCRIPTION OF THE PREFERRED EMBODIMENTS

Figure 1:
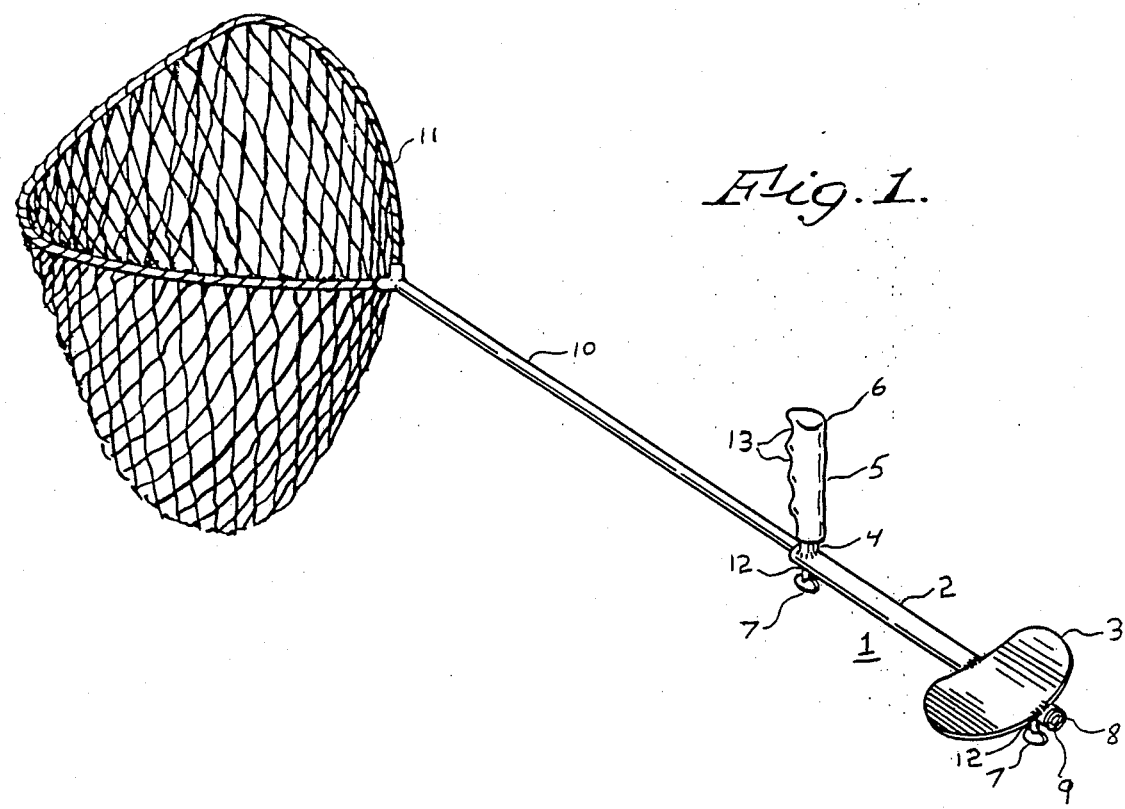
FIG. 1, is a perspective view of a removable lift improvement device suitable for fitting on a fisherman's landing net in accord with the invention.

FIG. 1 illustrates a removable lifting device in accord with the invention wherein the elongated main member is tubular and comprises thumb screw affixing means for affixing the main member to an elongated handle of a fisherman's landing net. In such configuration of the invention the tubular member can be circular, elliptical, boxed, triangular, splined or essentially any configuration which allows one to conveniently slide the tubular main member over the elongated pole handle of the device being fitted.

Any suitable means for affixing the tubular main member to the elongated handle may be utilized, but it is generally preferred to use thumb screw affixing means. It should be understood that it is within the contemplation of the invention to use multiple different affixing means, including snap fastening means, tubular compression means, catch means and the like.

One particular means which has been found to lend versatility to the lift improvement apparatus of the invention is a screw fastener means. When the main member is solid such means is located at the end of the main member opposite the forearm support means but when the main member is hollow, may be located anywhere along the length of the tubular main member. In such configuration, male or female screw fastening means are arranged on the main member to mate with a corresponding female or male screw fastening means on an elongated pole or handle attached to the end of the end working device, or to the device itself.

The forearm support means of the lift improvement device of the invention can be of any convenient configuration which allows contact with the backside of the forearm in such manner as to stabilize the tubular member from sideways motion. Generally, it is suitable to utilize a saddle configuration which generally curves and extends at least part way around the outside and the inside surfaces of the forearm, an amount sufficient to inhibit the main member from excessive sideways swing. In certain applications, a hoop configuration of the forearm support means is appropriate wherein the worker slips his hand through the hoop to grip the handle. The hoop may be completely or partially closed.

The forearm support means may be permanently fixed or adjustably mounted to the tubular main member so that it can be adjusted in the distance from the handle to the support means. The forearm support means may also be of fixed configuration or can be of adjustable configuration so as to adjust to the size and specific configuration of the forearm of the particular worker with whom it will be employed. Generally, it has been found that the distance between the handle and the forearm support means should be from about seven to about eighteen inches for maximum lift improvement effect.

The handle means can be of any convenient configuration to allow gripping by the hand of the worker. It was found that for maximum lifting improvement, the handle should generally extend perpendicular to the axis of the main member such that the hand, when in a closed, gripping position, is in a position generally perpendicular and unrotated to the forearm, as for example, when the arm is in a relaxed position at the side of the body with the palm facing inward. Some variation of the handle from the perpendicular is appropriate when the device is used for various utilities, but generally it was found that variations to about ±15° of perpendicular are the maximum for comfort and lifting convenience. The handle may be configured or not for maximum comfort, such as for example, it may contain indentations for various fingers and/or the thumb and may be covered in whole or part with padding or material which is soft and/or pliable to the feel. Generally, it has been found that a handle containing an abutment, at the upper end thereof, suitable to resist the slipping of the closed gripping hand therefrom is preferable.

Figure 2:
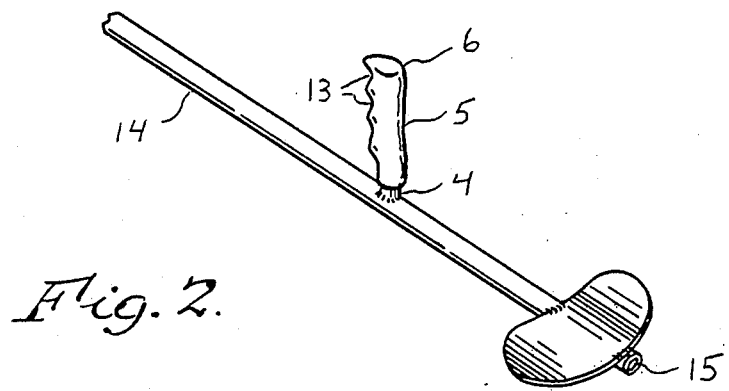
FIG. 2, is a perspective view of a pole configured to embody the lift improvement device of the invention.

Referring now to FIGS. 1 and 2: FIG. 1 comprises a fishermen's landing net 11 having an elongated handle 10 extending therefrom. Removably attached to said elongated handle 10, at a manipulative end thereof, is a lift improvement device 1 of the invention, comprising main member 2, forearm support means 3 and handle 4. In this configuration, the main member 2 is tubular, with the inside tubular surface 8 thereof being configured such that the tubular member 2 mounts over the exterior surface 9 of the elongated handle 10. Thumb screw means 7,7 are screw attached 12,12 through the tubular member 2 and upon tightening, compress against elongated handle 10, thus firmly affixing the lift improvement device 1 of the invention to the elongated handle 10.

The handle means 4, comprises a handle grip 5, with finger indentations 13 and handle abutment 6. The handle grip in this configuration is further comprised of pliable material for comfort. In the lift improvement device of FIG. 1, the forearm support means is in a saddle configuration and is permanently affixed to the tubular member. It should be understood that it is within the contemplation of the invention that either or both of the handle and forearm support means can be permanently affixed or adjustably mounted.

FIG. 2, comprises a pole 14 configured with the lift improvement device of the invention. In this figure, the pole comprises the main member 2 with the forearm support means 3 and handle means 4 being affixed to the pole. As with the configuration of FIG. 1, either or both of the handle means 4 and forearm support means 3, can be permanently or adjustably mounted to the pole. The configuration of FIG. 2 provides for mounting of a single end working device at the working end of the pole, or the pole can contain an engaging means to accept attachment and removal of multiple different end working devices. FIG. 2 depicts the pole as hollow 15, and round; however a solid pole of any convenient shape is within the contemplation of the invention.

I claim:

1. A lift improvement device comprising an elongated, tubular, hollow main member having an internal configuration suitable for completely sliding said hollow member over an elongated handle, said member having means at each end thereof for engaging said handle and fixing said member to said handle, said member having integrally attached at one end thereof a forearm support means and having integrally attached at a point along the member, from about seven to about eighteen inches from said support means, a handle gripping means, said forearm support means and said handle gripping means being positioned on said elongated main member such that upon a hand gripping said handle gripping means, with the wrist in a relaxed, unrotated position, the forearm support means contacts the backside of the forearm and the elongated member generally follows the backside of the forearm in a straight line from the wrist to the elbow.

2. The lift improvement device of claim 1 wherein said means for engaging and fixing comprises thumb screw affixing means, extending into the hollow interior of said hollow member.

3. The lift improvement device of claim 1 wherein said forearm support means is curved and extends at least part way around the inside and outside surfaces of a forearm, in an amount sufficient to inhibit sideway motion and generally comprises a saddle configuration.

4. The lift improvement device of claim 1 wherein said handle gripping means is disposed within about 15° of perpendicular to the longitudinal axis of the elongated member.

5. The lift improvement device of claim 4 wherein said handle gripping means is perpendicular to the elongated member.

6. The lift improvement device of claim 4 wherein said handle gripping means contains indentations for fingers.

7. The lift improvement device of claim 4 wherein said handle gripping means comprises an abutment at the upper end thereof.

8. The lift improvement device of claim 1 wherein said handle is attached to an end working device.

9. The lift improvement device of claim 8 wherein said end working device comprises a net.

10. The device of claim 1, wherein said handle comprises a pole.

11. The device of claim 1 wherein said handle comprises a rod.

* * * * *